(12) United States Patent
Xu

(10) Patent No.: US 11,042,968 B2
(45) Date of Patent: Jun. 22, 2021

(54) METHOD AND APPARATUS FOR ENHANCING VEHICLE DAMAGE IMAGE ON THE BASIS OF A GENERATIVE ADVERSARIAL NETWORK

(71) Applicant: Advanced New Technologies Co., Ltd., Grand Cayman (KY)

(72) Inventor: Juan Xu, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 17/154,868

(22) Filed: Jan. 21, 2021

(65) Prior Publication Data
US 2021/0150672 A1   May 20, 2021

Related U.S. Application Data

(63) Continuation of application No. PCT/CN2019/098970, filed on Aug. 2, 2019.

(30) Foreign Application Priority Data

Sep. 4, 2018   (CN) .......................... 201811027109.9

(51) Int. Cl.
*G06K 9/62* (2006.01)
*G06T 5/00* (2006.01)
(Continued)

(52) U.S. Cl.
CPC ............ *G06T 5/001* (2013.01); *G06K 9/6215* (2013.01); *G06K 9/6256* (2013.01); *G06N 3/0454* (2013.01); *G06N 3/08* (2013.01); *G06T 7/0002* (2013.01); *G06T 2207/20081* (2013.01); *G06T 2207/20084* (2013.01); *G06T 2207/30248* (2013.01)

(58) Field of Classification Search
CPC ................... G06T 5/001; G06T 7/0002; G06T 2207/20084; G06T 2207/20081; G06T 2207/30248; G06N 3/08; G06N 3/0454; G06K 9/6215; G06K 9/6256
See application file for complete search history.

(56) References Cited

U.S. PATENT DOCUMENTS

2018/0314899 A1* 11/2018 Dreyfuss .............. G06K 9/4628
2018/0341836 A1* 11/2018 Lim ..................... G06T 7/0002
(Continued)

OTHER PUBLICATIONS

Hou, Ming et al., "Generative Adversarial Positive-Unlabelled Learning" arXiv:1711.08054v2 [cs.LG] Apr. 4, 2018.*
(Continued)

*Primary Examiner* — Samir A Ahmed
(74) *Attorney, Agent, or Firm* — Shun Yao; Park, Vaughan, Fleming & Dolwer LLP

(57) ABSTRACT

Embodiments of the present specification provide a method and system for improving the quality of a vehicle damage image on the basis of a GAN network. During operation, the system obtains a first vehicle damage image and inputs the first vehicle damage image to a machine-learning model to obtain a second vehicle damage image. The machine-learning model is trained using a plurality of labeled samples of vehicle damage images, and the second vehicle damage image has a better quality than the first vehicle damage image.

13 Claims, 8 Drawing Sheets

(51) Int. Cl.
*G06T 7/00* (2017.01)
*G06N 3/08* (2006.01)
*G06N 3/04* (2006.01)

(56) References Cited

U.S. PATENT DOCUMENTS

2019/0130278 A1* 5/2019 Karras .................. G06N 3/082
2019/0279009 A1* 9/2019 Srirangam Narashiman et al. .....
G06T 7/248

OTHER PUBLICATIONS

Mao, Xudong et al., "Least Squares Generative Adversarial Networks", Proceedings of the IEEE International Conference on Computer Vision, 2017.*
Maeda, Hiroya et al., "Road Damage Detection and Classification Using Deep Neural Networks with Smartphone Images", Computer-Aided Civil and Infrastructure Engineering, pp. 1-15, 2018.*
Haung, Xun et al., Stacked Generative Adversarial Networks, Proceedings of the IEEE International Conference on Computer Vision, 2017.*

* cited by examiner

METHOD AND APPARATUS FOR ENHANCING VEHICLE DAMAGE IMAGE ON THE BASIS OF A GENERATIVE ADVERSARIAL NETWORK

RELATED APPLICATION

Under 35 U.S.C. § 120 and § 365(c), this application is a continuation of PCT Application No. PCT/CN2019/098970, entitled "METHOD AND APPARATUS FOR ENHANCING VEHICLE DAMAGE IMAGE ON THE BASIS OF GAN NETWORK," by inventor Juan Xu, filed 2 Aug. 2019, which claims priority to Chinese Patent Application No. 201811027109.9, filed on 4 Sep. 2018.

TECHNICAL FIELD

Embodiments of the present specification relate to the technical field of image processing, and more particularly relate to a method and an apparatus for training a discriminative model, a method and apparatus for training a generative model, and a method and apparatus for improving the quality of a vehicle damage image.

BACKGROUND

In a conventional scenario of vehicle insurance claim settlement, an insurance company needs to send a professional inspection and assessment personnel to a scene of accident to perform on-site inspection and loss assessment, determine a vehicle repair plan and an amount of compensation, capture on-site photographs, and archive the photographs for loss assessment such that verification personnel can verify the loss and the amount of compensation. Because manual inspection and loss assessment is required, the insurance company needs to invest a great amount of labor costs and costs for providing training to improve professional knowledge. From the perspective of general user experience, a claim settlement period is long because the claim settlement process involves manually capturing on-site photographs by inspection personnel, performing loss assessment by assessment personnel at a repair site, and performing loss verification by loss verification personnel at a backend.

With the development of the Internet, emerged is a claim settlement scheme in which, after a user captures photographs of vehicle damage on site and uploads the photographs to a server, loss assessment is performed by an algorithm or a person on the basis of the vehicle damage photographs so as to perform loss assessment and settle the claim. However, in the process of capturing the vehicle damage photographs, some low-quality photographs are often obtained, such as photographs captured in a poor lighting condition, blurred photographs, poorly contrasted photographs, and so on, affecting the identification of damage details on the images by human eyes and algorithms.

Therefore, there is a need for a more efficient solution for improving the quality of vehicle damage images.

SUMMARY

Embodiments of the present specification are intended to provide a more efficient scheme for improving the quality of vehicle damage images to address deficiencies in the current technologies.

To achieve the above objective, one aspect of the specification provides a system and method for enhancing a vehicle damage image. During operation, the system obtains a first vehicle damage image and inputs the first vehicle damage image to a machine-learning model to obtain a second vehicle damage image. The machine-learning model is trained using a plurality of labeled samples of vehicle damage images, and the second vehicle damage image has a better quality than the first vehicle damage image.

In a variation on this embodiment, at least one of the following of the first vehicle damage image is of low quality: color, texture, brightness, contrast, saturation, clarity, and smoothness.

In a variation on this embodiment, a distortion degree of the second vehicle damage image with respect to the first vehicle damage image is less than a predetermined threshold.

In a variation on this embodiment, the machine-learning model is obtained by training a generative model in a generative adversarial network (GAN) model. The GAN model further comprises a quality discriminative model configured to determine whether an output image of the generative model is a high-quality image. The system trains the generative model in the GAN model by: obtaining a plurality of third vehicle damage images being low-quality images; and training, using at least the plurality of third vehicle damage images and based on the quality discriminative model, the generative model.

In a further variation, the system trains the quality discriminative model by: obtaining a plurality of positive samples and a plurality of negative samples, the positive samples being high-quality vehicle damage images, the negative samples being low-quality vehicle damage images; and using at least the plurality of positive samples and the plurality of negative samples to train a classification model to be used as the quality discriminative model.

In a further variation, the GAN model further comprises a distortion degree discriminative model configured to determine a distortion degree of an output image of the generative model with respect to a corresponding third vehicle damage image. Training the generative model in the GAN model further comprises: training the generative model based on at least the plurality of third vehicle damage images and the distortion degree discriminative model.

In a further variation, the distortion degree discriminative model comprises a semantic recognition model and a reconstruction model, and the reconstruction model is a deconvolution model of the generative model. Training the generative model further comprises: inputting the output image of the generative model into the reconstruction model to obtain a reconstructed image, inputting the reconstructed image and a corresponding third vehicle damage image respectively into the semantic recognition model to determine a semantic similarity between the reconstructed image and the corresponding third vehicle damage image, and determining the distortion degree of the output image with respect to the corresponding third vehicle damage image on the basis of the semantic similarity.

In a further variation, the semantic similarity between the reconstructed image and the corresponding third vehicle damage image comprises one or more of: a similarity in vehicle part, a similarity in vehicle model, and a similarity in vehicle damage.

In a variation on this embodiment, the system further uses the second vehicle damage image to train a vehicle damage identification model, which is configured to identify damage to a vehicle on the basis of a vehicle damage image.

In a variation on this embodiment, the system further performs loss assessment on a corresponding vehicle by inputting the second vehicle damage image into a previously trained vehicle damage identification model.

Another aspect of the present specification provides a computer-executed apparatus for improving the quality of a vehicle damage image, comprising:

a first acquisition unit, configured to acquire a first image, the first image being a low-quality vehicle damage image; and a first input unit, configured to input the first image into an image enhancement model to obtain a second image from an output of the image enhancement model, wherein the image enhancement model outputs the second image by improving the quality of the first image.

In one embodiment, at least one of the following of the first image is of low quality: color and texture.

In one embodiment, at least one of the following of the first image is of low quality: brightness, contrast, saturation, clarity, and smoothness.

In one embodiment, the distortion degree of the second image with respect to the first image is less than a predetermined threshold.

In one embodiment, the image enhancement model is obtained by training a generative model in a GAN model, and the GAN model further comprises a quality discriminative model, wherein the quality discriminative model is configured to determine whether an output image of the generative model is a high-quality image, and wherein training the generative model in the GAN model comprises:

acquiring a plurality of third images, the third images being low-quality vehicle damage images; and training, using at least the plurality of third images and on the basis of the quality discriminative model, the generative model to be used as the image enhancement model.

In one embodiment, the quality discriminative model is trained by:

acquiring a plurality of positive samples and a plurality of negative samples, the positive samples being high-quality vehicle damage images, the negative samples being low-quality vehicle damage images; and using at least the plurality of positive samples and the plurality of negative samples to train a classification model to be used as the quality discriminative model.

In one embodiment, the GAN model further comprises a distortion degree discriminative model, wherein the distortion degree discriminative model is configured to acquire a distortion degree of the output image of the generative model with respect to a corresponding third image, wherein training the generative model in the GAN model further comprises: training the generative model by using at least the plurality of third images and on the basis of the distortion degree discriminative model.

In one embodiment, the distortion degree discriminative model comprises a semantic recognition model and a reconstruction model, wherein the reconstruction model is a deconvolution model of the generative model, and the apparatus further comprises:

a second input unit, configured to input the output image into the reconstruction model to obtain a reconstructed image;

a determination unit, configured to input the reconstructed image and a corresponding third image respectively into the semantic recognition model to determine the semantic similarity between the reconstructed image and the corresponding third image; and a second acquisition unit, configured to acquire the distortion degree of the output image with respect to the corresponding third image on the basis of the semantic similarity.

In one embodiment, the determination unit is further configured to determine the semantic similarity between the reconstructed image and the corresponding third image on the basis of at least one of the following: whether the vehicle parts in the two images are similar, whether the vehicle models in the two images are the same, and whether the vehicle damage in the two images is similar.

In one embodiment, the apparatus further comprises: a first using unit, configured to use the second image to train a vehicle damage identification model after obtaining the second image, wherein the vehicle damage identification model is configured to identify damage to a vehicle on the basis of a vehicle damage image.

In one embodiment, the apparatus further comprises: a second using unit, configured to input the second image into a vehicle damage identification model after obtaining the second image, so as to perform loss assessment on a corresponding vehicle.

Another aspect of the present specification provides a computing device, comprising a memory and a processor, wherein the memory comprises an executable code stored therein, and when the executable code is executed by the processor, the method of any one of the above is implemented.

The quality of the vehicle damage image is effectively improved by the solution of the embodiments of the present specification for enhancing a vehicle damage image on the basis of a GAN network. The vehicle damage image can be used to train the vehicle damage identification model, thereby effectively improving the quality of the training sample, so that the trained vehicle damage identification model is more accurate. The vehicle damage image may also be input into a loss-assessing model to assess loss for a corresponding accident vehicle, thereby making the loss assessment result more accurate.

In this disclosure, the terms high-quality images and low-quality images are relative terms. In general, a high-quality image has a better quality (e.g., in terms of color, texture, brightness, contrast, saturation, clarity, smoothness, etc.) than that of a low-quality image.

BRIEF DESCRIPTION OF THE DRAWINGS

Embodiments of the present specification may be made clearer by describing them with reference to accompanying drawings.

DETAILED DESCRIPTION

Embodiments of the present specification will be described below with reference to accompanying drawings.

Figure 1:
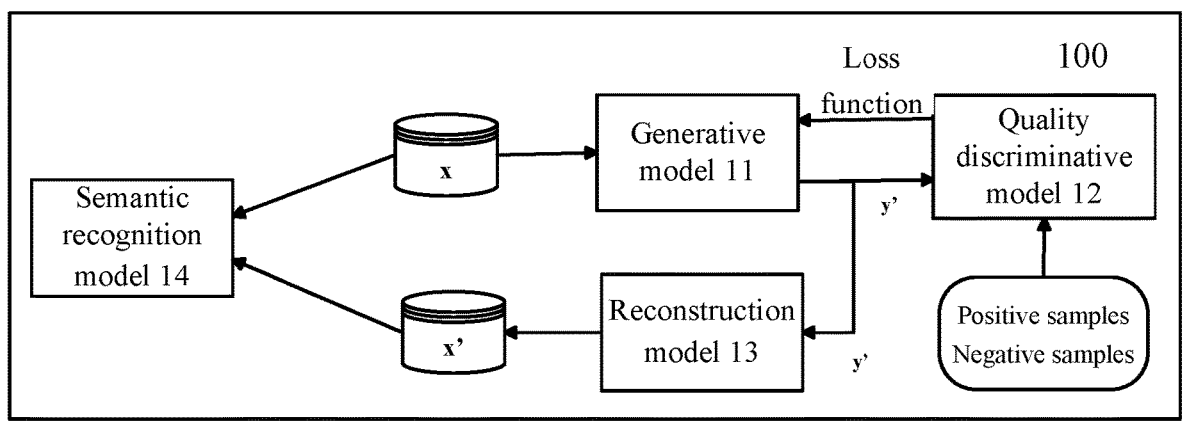
FIG. 1 illustrates a schematic diagram of a vehicle damage image enhancement system 100 according to an embodiment of the present specification.

FIG. 1 illustrates a schematic diagram of a vehicle damage image enhancement system 100 according to an embodiment of the present specification. As shown in FIG. 1, system 100 corresponds to a Generative Adversarial Network model (GAN model) comprising: a generative model 11, a quality discriminative model 12, a reconstruction model 13, and a semantic recognition model 14. Reconstruction model 13 and semantic recognition model 14 constitute a distortion degree discriminative model.

At the model training stage, quality discriminative model 12 is first trained by using at least one positive sample and/or at least one negative sample. The positive sample is a high-quality vehicle damage image, and the negative sample is a low-quality vehicle damage image. The discriminative model, for example, is configured to determine the probability of the input image being a high-quality image. For example, the quality of the image is determined on the basis of brightness, contrast, saturation, clarity, smoothness, and the like of the image. The more accurate the determination given by quality discriminative network 12 for the sample is, the smaller the loss function is. Thus, a quality discriminative model 12 is trained by the at least one positive sample and/or at least one negative sample to reduce the loss function of quality discriminative model 12.

After quality discriminative model 12 is well trained, generative model 11 can be trained using quality discriminative model 12. Specifically, as shown in FIG. 1, at least one training sample (x) is input into generative model 11, wherein the training sample is a low-quality vehicle damage image x. The output of generative model 11 based on image x is y'. The y' is input into the quality discriminative model 12, thereby obtaining a loss function for generative model 11 on the basis of discrimination of y' by quality discriminative model 12 (i.e., the output of quality discriminative model 12 based on y'). That is, the greater the discriminant value of quality discriminative model 12 is, the better the quality of image y' generated by generative model 11 is, and the smaller the loss function is.

After obtaining output y' of generative model 11, y' is further input into reconstruction model 13. Reconstruction model 13 is a deconvolution model (i.e., an inverse model) of generative model 11, thus the parameters of reconstruction model 13 are associated with the parameters of generative model 11, and reconstruction model 13 is configured to reconstruct y', i.e., to obtain x'.

Then, x and x' are respectively input into semantic recognition model 14 to acquire the semantic similarity between x and x', such as whether the vehicle parts are similar, whether the vehicle models are the same, whether the vehicle damage is similar, or the like. In the loss function of training generative model 11, a term associated with the semantic similarity is also added, i.e., the higher the similarity is, the smaller the model's loss function associated with the semantic similarity is. Thereby the generative model is trained to generate a high-quality image without distortion.

Figure 2:
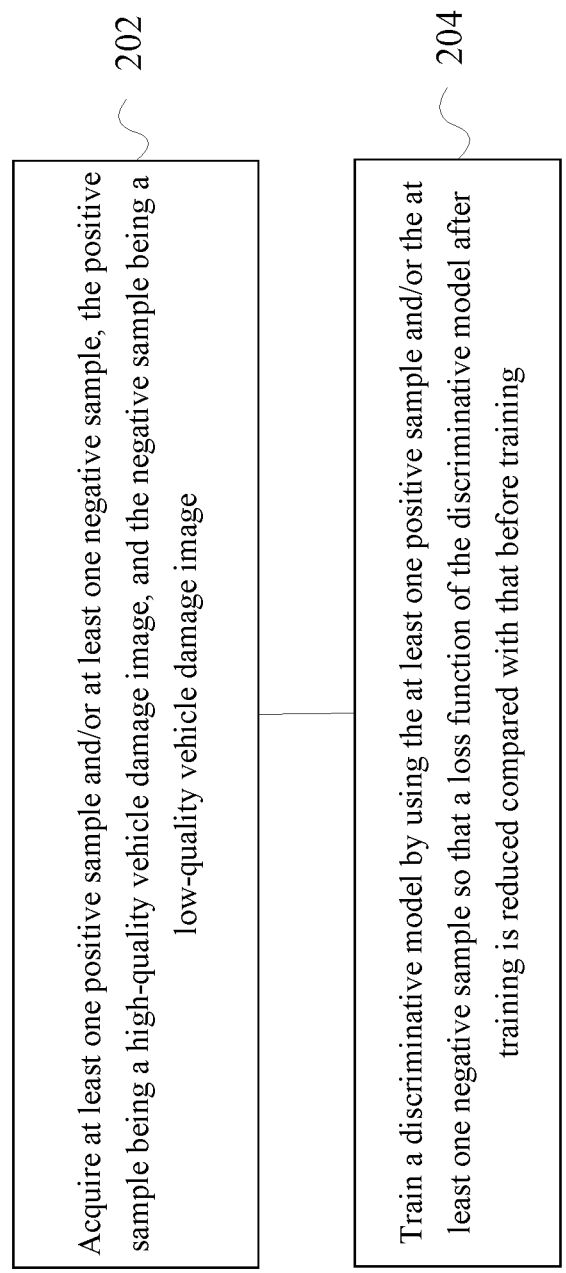
FIG. 2 illustrates a flowchart of a method for training a discriminative model according to an embodiment of the present specification.

FIG. 2 illustrates a flowchart of a method for training a quality discriminative model according to an embodiment of the present specification. The quality discriminative model comprises a convolutional neural network and is used for determining the quality of the vehicle damage image input therein. The method is a training process for training the quality discriminative model, comprising:

at step S202, acquiring at least one positive sample and/or at least one negative sample, the positive sample being a high-quality vehicle damage image, and the negative sample being a low-quality vehicle damage image; and at step S204, using the at least one positive sample and/or the at least one negative sample to train the quality discriminative model so that a loss function of the quality discriminative model after training is reduced compared with that before training, wherein the loss function is related to determining respective image qualities of the at least one positive sample and/or the at least one negative sample.

Firstly, at step S202, at least one positive sample and/or at least one negative sample is acquired, wherein the positive sample is a high-quality vehicle damage image, and wherein the negative sample is a low-quality vehicle damage image.

The quality discriminative model determines the quality of the input damage image of a vehicle (vehicle damage image), e.g., on the basis of the color and/or texture of the image. Determining the color, for example, comprises determining the brightness, contrast, saturation, and the like of the image, and determining the texture, for example, comprises determining the clarity, smoothness, and the like of the image. The output of the discriminative model is: the probability of the image being a high-quality image. For example, for a well trained discriminative model, when a high-quality vehicle damage image is input, its output value should be close to 1, that is, the probability of the image being a high-quality image is close to 100%, whereas when a low-quality vehicle damage image is input, its output value should be close to 0, that is, the probability of the image being a high-quality image is close to 0. It can be understood that the output value of the discriminative model described above is merely exemplary, and rather than being limited to a probability value between 0 and 1, it may be set freely depending on the needs of the specific scenario. For example, the output value of the quality discriminative model may be a sum of several probabilities, and the like.

On the basis of the purpose of the discriminative model described above, positive samples and negative samples for training a discriminative model are acquired. For example, a high-quality vehicle damage image having high color quality and high texture quality can be selected as a positive sample, wherein the color quality comprises brightness, contrast, saturation, and the like, and the texture quality comprises clarity, smoothness, and the like. A low-quality vehicle damage image having a low quality of any one of brightness, contrast, saturation, clarity, and smoothness can be selected as a negative sample. In addition, blurry or dimmer vehicle damage images can be generated by processing a high-quality vehicle damage image, such as reducing clarity, reducing contrast, etc., and be used as negative samples.

At step S204, the quality discriminative model is trained by using the at least one positive sample and/or the at least one negative sample so that a loss function of the discriminative model after training is reduced compared with that before training, and wherein the loss function is related to determining respective image qualities of the at least one positive sample and/or the at least one negative sample.

After the positive sample and the negative sample are obtained, the positive sample and the negative sample can be substituted into the loss function of the quality discriminative model so that parameters of the model can be adjusted using various optimization algorithms. The loss function $L_D(x,\theta)$ of the quality discriminative model can be shown as formula (1) below:

$$L_D(x, \theta_D) = -\frac{1}{m}\sum_{i,j}^{m} [\log D(x_i^+, \theta_D) + \log(1 - D(x_j^-, \theta_D))] \qquad (1)$$

wherein $\theta_D$ represents a parameter of the quality discriminative model, $x_i^+$ represents the positive sample, $x_j^-$ represents the negative sample, the sum of i and j is m, and $D(x_i^+, \theta_D)$ and $D(x_j^-, \theta_D)$ correspond to prediction formula of model discriminant value. As seen according to this loss function, the greater the discriminant value of the positive sample is, the smaller the loss function is, and the smaller the discriminant value of the negative sample is, the smaller the loss function is, that is, the loss function reflects the accuracy of the model's determination for the positive and negative samples. $\theta_D$ can be adjusted by, for example, gradient decent, so that the loss function value is reduced and the model is more accurate.

As described above, the quality discriminative model according to embodiments of the present specification is configured to determine the quality of the image. Therefore, the loss function used to train the discriminative model is also determined on the basis of the purpose of the discriminative model. Thus, the loss function comprises loss terms related to determining the quality of the image, such as determining the image color quality, determining the image texture quality, and the like. Determining the image color quality comprises determining the brightness, contrast, saturation, and the like of the image, and determining the image texture quality comprises determining the clarity, smoothness, and the like of the image. Thus, on the basis of a specific content for determining, specific forms of the loss function may comprise a variety of forms.

Figure 3:
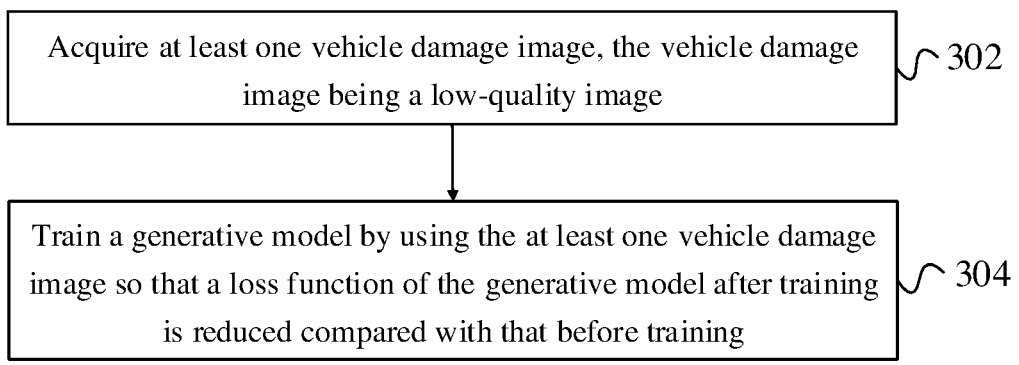
FIG. 3 illustrates a flowchart of a method for training a generative model according to an embodiment of the present specification.

FIG. 3 illustrates a flowchart of a method for training a generative model according to an embodiment of the present specification. The generative model comprises a convolutional neural network and is used for generating high-quality vehicle damage images on the basis of the low-quality vehicle damage images input therein. The method is a training process for training the generative model, comprising:

at step S302, acquiring at least one vehicle damage image, the vehicle damage image being a low-quality image; and at step S304, training the generative model by using the at least one vehicle damage image so that a loss function of the generative model after training is reduced compared with that before training, wherein the loss function comprises a first loss function, wherein the first loss function is obtained by performing a determination operation on at least one output image on the basis of the discriminative model trained by the method shown in FIG. 2, wherein the at least of one output image is a respective output of the generative model based on the at least one vehicle damage image.

First, at step S302, at least one vehicle damage image is acquired, wherein the vehicle damage image is a low-quality vehicle damage image. The acquisition of the low-quality vehicle damage image may reference the above description of step S202 of FIG. 2, and will not be repeated.

At step S304, the generative model is trained by using the at least one vehicle damage image so that a loss function of the generative model after training is reduced compared with that before training, wherein the loss function comprises a first loss function, wherein the first loss function is obtained by performing a determination operation on at least one output image on the basis of the quality discriminative model trained by the method shown in FIG. 2, wherein the at least of one output image is a respective output of the generative model based on the at least one vehicle damage image.

The well trained generative model is an image enhancement model comprising a convolutional neural network, which improves the quality of the input image by performing up-sampling, interpolation, etc. on an input vehicle damage image x, thereby obtaining a high-quality output image G(x).

The loss function $L_G(z,\theta_G)$ of the generative model can be shown as formula (2) below:

$$L_G(x, \theta_G) = \qquad (2)$$
$$\frac{1}{m}\sum_i^m \log(1 - D(G(x_i, \theta_G))) + \frac{1}{m}\sum_i^m (Y(F(G(x_i, \theta_G))) - Y(x_i))^2$$

The first term of formula (2) is a loss function obtained on the basis of the quality discriminative model described above. $\theta_G$ is a parameter of the generative model, $x_i$ is input data of the generative model, i.e., the vehicle damage image input therein, $G(x_i,\theta_G)$ is an output of the generative model, i.e., an output image, and $D(G(x_i,\theta_G))$ is a discriminant value output by inputting the output image in the quality discriminative model trained through the method shown in FIG. 2.

In one embodiment, the loss function used to train the generative model comprises only the loss function of the first term in formula (2) described above. That is, when the generative model is trained, the loss function of the generative model is obtained only on the basis of the output of the quality discriminative model. As can be seen from the first term, the greater the discriminant value output from the quality discriminative model is, the smaller the loss function is. That is, the greater the discriminant value is, the better the quality of the output image generated by the generative model is, and the smaller the loss of the model is. Thus, $\theta_G$ is adjusted by various optimization algorithms such as gradient descent, so that the smaller the loss function is, and the greater the discriminant value of the discriminative model is, that is, the higher the quality of the output image generated by the generative model is, thus optimizing the generative model.

The second term in formula (2) is a loss function obtained on the basis of the semantic recognition model and the reconstruction model shown in FIG. 1, the semantic recognition model and the reconstruction model constitute a distortion degree discriminative model in the GAN model, which is related to the distortion degree of output y' of the generative model with respect to input x of the generative model. It can be understood that the distortion degree discriminative model is not limited to the structure described herein, for example, it may comprise only the semantic recognition model that obtain the distortion degree of y' by direct comparison of the semantic similarity between y' and x. $F(G(x_i,\theta_G))$ is the output of the reconstruction model (the reconstructed image, i.e., x' in FIG. 1) in FIG. 1 by inputting the output of the generative model $G(x_i,\theta_G)$ (i.e., y' in FIG. 1) into the reconstruction model. As described above, the reconstruction model is the inverse model of the generative model, and thus the model parameters in the model function F(y') of the reconstruction model can be converted to $\theta_G$, and the output x' is the reconstructed image obtained by reconstructing y' toward the x.

Y(x) is the model function of the semantic recognition model in FIG. 1, corresponding to the output of the semantic recognition model, and for example, may be a semantic feature of image x. The semantic recognition model is a predetermined model, such as, a semantic recognition model based on imagenet existing in current technologies, or a semantic recognition model trained using a plurality of labeled samples of vehicle damage images. As shown in FIG. 1, the semantic features Y(x) and Y(x') of x and x' can be obtained respectively by inputting x and x' respectively into the semantic recognition model, so that the semantic similarity (i.e., content similarity) between x and x' can be calculated on the basis of Y(x) and Y(x'). For example, the semantic similarity between x and x' may be determined on the basis of at least one of the following: whether the vehicle parts are similar, whether the vehicle models are the same, whether the vehicle damage is similar, and the like. Thus, on the basis of the semantic similarity, it can be determined whether output y' of the generative model is distorted with respect to input x, and whether the contents are the same.

In one embodiment, the generative model is trained on the basis of the loss function shown in formula (2) described above. That is, as shown in FIG. 1, an image quality loss function of the generative model is obtained on the basis of the quality discriminative model, and the distortion degree loss function of the generative model is obtained on the basis of the distortion degree discriminative model. As can be seen from the loss function of the second term in formula (2), the higher the similarity between x and x' is, the smaller the second loss function is, that is, the lower the distortion degree of y' with respect to the input x is, and thus the better the model is. Therefore, parameter $\theta_G$ is adjusted by optimization algorithms such as gradient descent on the basis of the above formula (2), so that the quality of the output image is higher while the distortion degree of the output image is reduced, thus optimizing the generative model.

Figure 4:
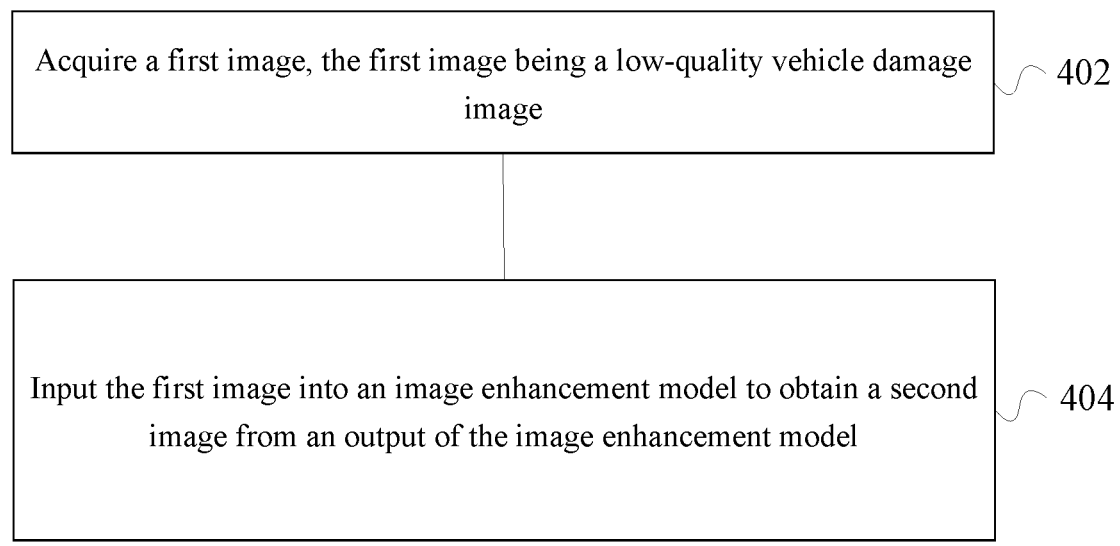
FIG. 4 illustrates a flowchart of a computer-executed method for improving the quality of a vehicle damage image according to an embodiment of the present specification.

FIG. 4 illustrates a flowchart of a computer-executed method for improving the quality of a vehicle damage image according to an embodiment of the present specification, and the method comprises:

at step S402, acquiring a first image, the first image being a low-quality vehicle damage image; and at step S404, inputting the first image into an image enhancement model trained by the method shown in FIG. 3 to obtain a second image from an output of the image enhancement model, wherein the image enhancement model outputs the second image by improving the quality of the first image.

The implementation of step S402 can be described with reference to the corresponding description of step S202 of FIG. 2 above, and will not be repeated here.

At step S404, the first image is input into an image enhancement model trained by the method shown in FIG. 3 to obtain a second image from an output of the image enhancement model, wherein the image enhancement model outputs the second image by improving the quality of the first image. As described above, according to the above training process of the generative model, a low-quality vehicle damage image is input into the well trained generative model (i.e., the image enhancement model), and the generative model outputs an output image (i.e., the second image) obtained by improving the quality of the low-quality vehicle damage image. In one embodiment, the generative model is trained on the basis of the loss function shown in formula (2) described above, in that case the quality of the second image is improved with respect to the first image while the distortion degree thereof is maintained to be lower.

After obtaining a high-quality vehicle damage image (i.e., the second image) by this method, the second image may be used to train a vehicle damage identification model, wherein the vehicle damage identification model is used to identify damage to a vehicle on the basis of a vehicle damage image. Specifically, the second image can be labeled and then used as a training sample to train the vehicle damage identification model. In one embodiment, the second image may be input into a vehicle damage identification model, so as to perform loss assessment on a corresponding vehicle.

Figure 5:
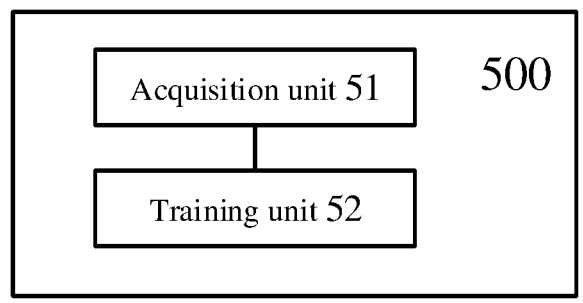
FIG. 5 illustrates an apparatus 500 for training a discriminative model according to an embodiment of the present specification.

FIG. 5 illustrates an apparatus 500 for training a quality discriminative model according to an embodiment of the present specification. The discriminative model comprises a convolutional neural network and is used for determining the quality of the vehicle damage image input therein, and the apparatus comprises:

an acquisition unit 51, configured to acquire at least one positive sample and/or at least one negative sample, the positive sample being a high-quality vehicle damage image, and the negative sample being a low-quality vehicle damage image; and a training unit 52, configured to train the quality discriminative model by using the at least one positive sample and/or the at least one negative sample so that a loss function of the quality discriminative model after training is reduced compared with that before training, wherein the loss function is related to determining respective image qualities of the at least one positive sample and/or the at least one negative sample.

In one embodiment, in the apparatus for training the quality discriminative model, the loss function comprises a loss function associated with determining the quality of at least one of the following: color and texture.

In one embodiment, in the apparatus for training the quality discriminative model, the loss function comprises a loss function associated with determining the quality of at least one of the following: brightness, contrast, saturation, clarity, and smoothness.

Figure 6:
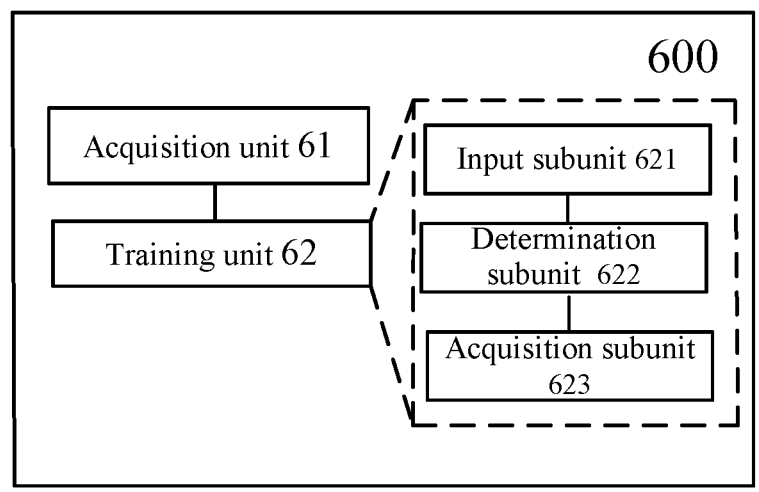
FIG. 6 illustrates an apparatus 600 for training a generative model according to an embodiment of the present specification.

FIG. 6 illustrates an apparatus 600 for training a generative model according to an embodiment of the present specification. The generative model comprises a convolutional neural network and is used for generating high-quality vehicle damage images on the basis of the low-quality vehicle damage images input therein, and the apparatus comprises:

an acquisition unit 61, configured to acquire at least one vehicle damage image, the vehicle damage image being a low-quality vehicle damage image; and a training unit 62, configured to train the generative model by using the at least one vehicle damage image so that a loss function of the generative model after training is reduced compared with that before training, wherein the loss function comprises a first loss function, wherein the first loss function is obtained by respectively performing a determination operation on at least one output image on the basis of the quality discriminative model trained by the apparatus for training quality discriminative models described above, wherein the at least of one output image is an output of the generative model respectively based on the at least one vehicle damage image.

In one embodiment, the GAN model further comprises a distortion degree discriminative model, wherein the distortion degree discriminative model is configured to obtain a distortion degree of the output image of the generative model with respect to a corresponding vehicle damage image. In the apparatus for training the generative model, the loss function further comprises a second loss function related to the distortion degree of the at least one output image with respect to the corresponding vehicle damage image. Training unit 62 is further configured to train the generative model by using the at least one vehicle damage image and on the basis of the distortion degree discriminative model.

In one embodiment, the distortion degree discriminative model comprises a semantic recognition model and a reconstruction model, wherein the reconstruction model is a deconvolution model of the generative model, and training unit 62 further comprises:

an input subunit 621, configured to input the output image into the reconstruction model to obtain a reconstructed image;

a determination subunit 622, configured to input the reconstructed image and a corresponding vehicle damage image respectively into the semantic recognition model to determine the semantic similarity between the reconstructed image and the corresponding vehicle damage image; and an acquisition subunit 623, configured to acquire the distortion degree of the output image with respect to the corresponding vehicle damage image on the basis of the semantic similarity.

In one embodiment, in the apparatus for training the generative model, the semantic similarity is determined on the basis of at least one of the following: whether the vehicle parts are similar, whether the vehicle models are the same, and whether the vehicle damage is similar.

Figure 7:
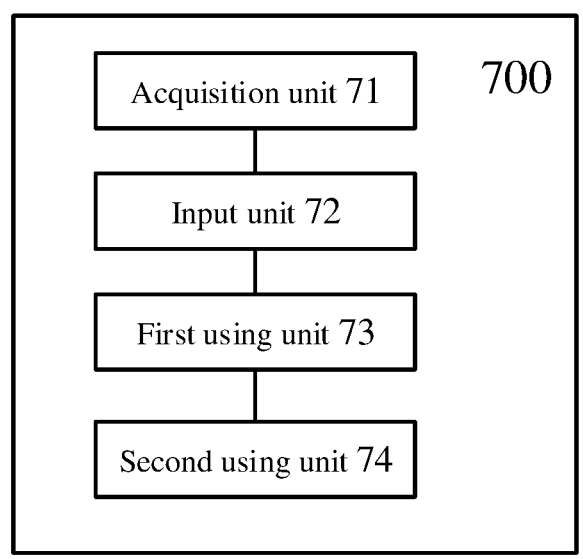
FIG. 7 illustrates a computer-executed apparatus 700 for improving the quality of a vehicle damage image according to an embodiment of the present specification.

FIG. 7 illustrates a computer-executed apparatus 700 for improving the quality of a vehicle damage image according to an embodiment of the present specification, comprising:

an acquisition unit 71, configured to acquire a first image, the first image being a low-quality vehicle damage image; and an input unit 72, configured to input the first image into the generative model trained by the apparatus for training the generative model described above to obtain a second image of improved quality on the basis of the first image.

In one embodiment, the apparatus for improving the quality of images further comprises: a first using unit 73, configured to use the second image to train a vehicle damage identification model after generating the second image, wherein the vehicle damage identification model is configured to identify damage to a vehicle on the basis of a vehicle damage image.

In one embodiment, the apparatus for improving the quality of images further comprises: a second using unit 74, configured to input the second image into a vehicle damage identification model after generating the second image, so as to perform loss assessment on a corresponding vehicle.

Another aspect of the present specification provides a computing device, comprising a memory and a processor, wherein the memory comprises an executable code stored therein, and when the executable code is executed by the processor, the method of any one of the above is implemented.

Figure 8:
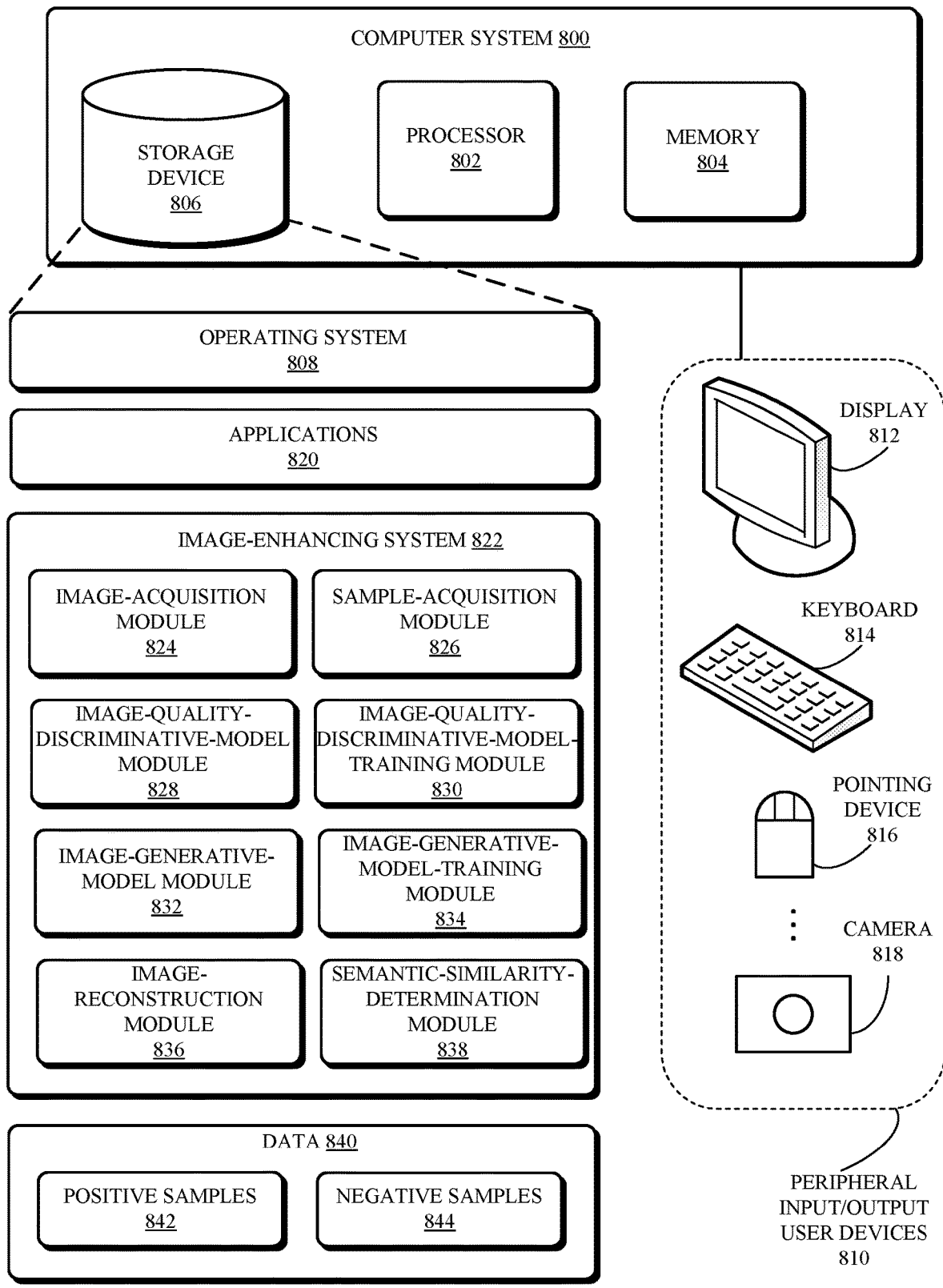
FIG. 8 illustrates an exemplary computer and communication system for improving the quality of a vehicle damage image according to one embodiment of the present specification.

FIG. 8 illustrates an exemplary computer and communication system for improving the quality of a vehicle damage image according to one embodiment of the present specification. In FIG. 8, computer system 800 can include a processor 802, a memory 804, and a storage device 806. Furthermore, computer system 800 can be coupled to peripheral input/output (I/O) user devices 810, e.g., a display device 812, a keyboard 814, a pointing device 816, and a camera 818. Storage device 806 can store an operating system 808, one or more applications 820, an image-enhancing system 822, and data 840.

Applications 820 can include instructions, which can be loaded from storage device 806 into memory 804 and executed by processor 802. As a result, computer system 800 can perform specific functions provided by applications 820.

Image-enhancing system 822 can include instructions, which when executed by computer system 800, can cause computer system 800 or processor 802 to perform methods and/or processes described in this disclosure. Specifically, image-enhancing 822 can include instructions for acquiring (e.g., via camera 818) a low quality image (image-acquisition module 824), instructions for acquiring positive and negative samples (sample-acquisition module 826), instructions for implementing an image-quality-discriminative model (image-quality-discriminative-model module 828), and instructions for training the image-quality-discriminative model using the positive and negative samples (image-quality-discriminative-model-training module 830), instructions implementing an image-generative model (image-generative-model module 832), instructions for training the image-generative model based on the image-quality-discriminative model (image-generative-model-training module 834), instructions for reconstructing an original image based on a generated image (image-reconstruction module 836), and instructions for determining semantic similarities between the original image and the reconstructed image (semantic-similarity-determination module 838).

Data 840 can include positive samples 842 and negative samples 844. More specifically, positive samples 842 can include high quality images, and negative samples 844 can include low quality images.

In some embodiments, applications 820 and the various modules in sample-labeling system 822, such as modules 824, 826, 828, 830, 832, 834, 836, and 838 can be partially or entirely implemented in hardware and can be part of processor 802. Further, in some embodiments, the system may not include a separate processor and memory. Instead, in addition to performing their specific tasks, modules 820, 824, 826, 828, 830, 832, 834, 836, and 838, either separately or in concert, may be part of general- or special-purpose computation engines.

Figure 9:
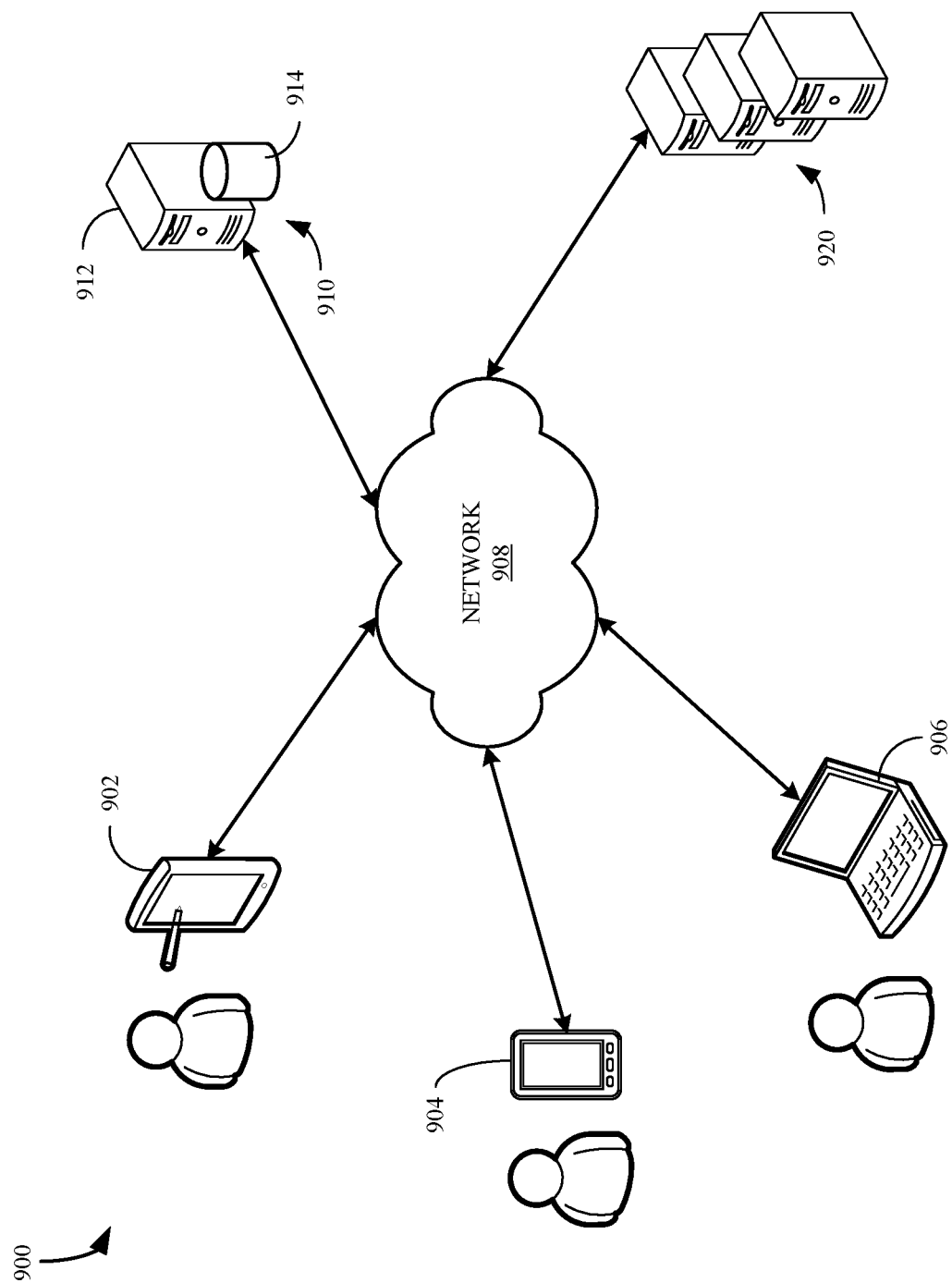
FIG. 9 illustrates an exemplary network environment for implementing the disclosed technology, in accordance with some embodiments described herein.

FIG. 9 illustrates an exemplary network environment for implementing the disclosed technology, in accordance with some embodiments described herein. A network environment 900 includes a number of electronic devices 902, 904 and 906 communicably connected to a server 910 by a network 908. One or more remote servers 920 are further coupled to the server 910 and/or the one or more electronic devices 902, 904 and 906.

In some exemplary embodiments, electronic devices 902, 904 and 906 can be computing devices such as laptop or desktop computers, smartphones, PDAs, wearable devices (e.g., smartwatches, smartglasses, etc.) portable media players, tablet computers, televisions or other displays with one or more processors coupled thereto or embedded therein, or other appropriate computing devices that can be used for displaying a web page or web application. In one example, the electronic devices 902, 904 and 906 store a user agent such as a browser or application. In the example of FIG. 9, electronic device 902 is depicted as a tablet computer, electronic device 904 is depicted as a smartphone, and electronic device 906 is depicted as a laptop computer.

Server 910 includes a processing device 912 and a data store 914. Processing device 912 executes computer instructions stored in data store 914, for example, to assist in scheduling a customer-initiated service or a service-provider-initiated service between a service provider and a customer at electronic devices 902, 904 and 906 during a service scheduling process.

In some exemplary aspects, server 910 can be a single computing device such as a computer server. In other embodiments, server 910 can represent more than one computing device working together to perform the actions of a server computer (e.g., cloud computing). The server 910 may host the web server communicably coupled to the browser at the client device (e.g., electronic devices 902, 904 or 906) via network 908. In one example, the server 910 may host a client application for scheduling a customer-initiated service or a service-provider-initiated service between a service provider and a customer during a service scheduling process. Server 910 may further be in communication with one or more remote servers 920 either through the network 908 or through another network or communication means.

The one or more remote servers 920 may perform various functionalities and/or storage capabilities described herein with regard to the server 910, either alone or in combination with server 910. Each of the one or more remote servers 920 may host various services. For example, servers 920 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Each of the one or more remote servers 920 can be a single computing device such as a computer server or can represent more than one computing device working together to perform the actions of a server computer (e.g., cloud computing). In one embodiment server 910 and one or more remote servers 920 may be implemented as a single server or a cluster of servers. In one example, server 910 and one or more remote servers 920 may communicate through the user agent at the client device (e.g., electronic devices 902, 904 or 906) via network 908.

Users may interact with the system hosted by server 910, and/or one or more services hosted by remote servers 920, through a client application installed at the electronic devices 902, 904, and 906. Alternatively, the user may interact with the system through a web-based browser application at the electronic devices 902, 904, and 906. Communication among client devices 902, 904, 906 and the system, and/or one or more services, may be facilitated through a network (e.g., network 908).

Communication among the client devices 902, 904, 906, server 910 and/or one or more remote servers 920 may be facilitated through various communication protocols. In some aspects, client devices 902, 904, 906, server 910 and/or one or more remote servers 920 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 908 can include, for example, any one or more of a personal area network (PAN), a local area network (LAN), a campus area network (CAN), a metropolitan area network (MAN), a wide area network (WAN), a broadband network (BBN), the Internet, and the like. Further, network 908 can include, but is not limited to, any one or more of the following network topologies, including a bus network, a star network, a ring network, a mesh network, a star-bus network, a tree or hierarchical network, and the like.

The quality of the vehicle damage image is effectively improved by the solution of the embodiments of the present specification for enhancing a vehicle damage image on the basis of a GAN network. The vehicle damage image can be used to train the vehicle damage identification model, thereby effectively improving the quality of the training sample, so that the trained vehicle damage identification model is more accurate. The vehicle damage image may also be input into a loss assessment model to assess loss for the respective accident vehicle, thereby making the loss assessment result more accurate.

Each embodiment of the present application is described in a progressive manner, and the same or similar sections between various embodiments are described with reference to each other, each of which is focused on the differences with other embodiments. Especially, the system embodiment is described relatively briefly because it is substantially similar to the method embodiments, and for related parts, reference may be made to the method embodiments.

The foregoing describes specific embodiments of the present application. Other embodiments fall within the scope of the appended claims. In some cases, the actions or steps recited in the claims may be performed in a sequence different from the order in the embodiments and may still achieve the desired result. Further, the processes depicted in the drawings do not necessarily require the particular order or sequential order shown to achieve the desired result. In certain implementations, multitasking and parallel processing is or may be advantageous.

It will be further appreciated by those of ordinary skill in the art that units and algorithms of each example described in the embodiments disclosed herein can be implemented by an electronic hardware, computer software, or a combination thereof. In order to clearly illustrate the interchangeability of hardware and software, compositions and steps of each example have been generally described in terms of function in the above description. Whether these functions are implemented in hardware or software depends on the specific application and design constraints of the technical scheme. Those of ordinary skill in the art may use different methods to implement the described functions for each particular application, but such implementation should not be considered beyond the scope of this application.

The steps of the methods or algorithms described in connection with the embodiments disclosed herein may be implemented with hardware, a software module executed by a processor, or a combination thereof. The software module may be placed in a Random Access Memory (RAM), a memory, a Read-Only Memory (ROM), an electrically programmable ROM, an electrically erasable programmable ROM, a register, a hard disk, a removable disk, a CD-ROM, or any other form of storage medium known in the art.

The objectives, the technical schemes, and the beneficial effects of the specification are further described in detail in the foregoing specific implementation. It should be understood that the foregoing descriptions are merely specific implementation of the specification, and are not intended to limit the protection scope of the specification. Any modification, equivalent replacement, and improvement made on the basis of the spirits and the principles of the specification shall fall within the protection scope of the specification.

What is claimed is:

1. A computer-executed method for enhancing a vehicle damage image, the method comprising:
   obtaining, by a computer, a first vehicle damage image; and
   inputting the first vehicle damage image to a pre-trained generative adversarial network (GAN) model to obtain a second vehicle damage image, which has a better quality than the first vehicle damage image;
   wherein the pre-trained GAN model comprises a pre-trained generative model and a pre-trained quality discriminative model configured to determine whether an image is a high-quality image;
   wherein the pre-trained quality discriminative model is obtained by training a classification model using a plurality of positive samples comprising high-quality vehicle damage images and a plurality of negative samples comprising low-quality vehicle damage images; and
   wherein the pre-trained generative model is trained using at least a plurality of low-quality vehicle damage images and the pre-trained quality discriminative model.

2. The method according to claim 1, wherein at least one of the following of the first vehicle damage image is of low quality: color, texture, brightness, contrast, saturation, clarity, and smoothness.

3. The method according to claim 1, wherein a distortion degree of the second vehicle damage image with respect to the first vehicle damage image is less than a predetermined threshold.

4. The method according to claim 1, wherein the GAN model further comprises a pre-trained distortion degree discriminative model configured to determine a distortion degree of an output image of the generative model with respect to a corresponding low-quality vehicle damage image, and wherein pre-training the generative model in the GAN model further comprises: training the generative model based on at least the plurality of low-quality vehicle damage images and the distortion degree discriminative model.

5. The method according to claim 4, wherein the distortion degree discriminative model comprises a semantic recognition model and a reconstruction model, wherein the reconstruction model is a deconvolution model of the generative model, and wherein pre-training the generative model further comprises:
   inputting the output image of the generative model into the reconstruction model to obtain a reconstructed image;
   inputting the reconstructed image and the corresponding low-quality vehicle damage image respectively into the semantic recognition model to determine a semantic similarity between the reconstructed image and the corresponding low-quality vehicle damage image; and
   determining the distortion degree of the output image with respect to the corresponding low-quality vehicle damage image on the basis of the semantic similarity.

6. The method according to claim 5, wherein the semantic similarity between the reconstructed image and the corresponding low-quality vehicle damage image comprises one or more of: a similarity in vehicle part, a similarity in vehicle model, and a similarity in vehicle damage.

7. A computer-executed apparatus for enhancing a vehicle damage image, comprising:
   an image-acquisition unit, configured to acquire a first vehicle damage image;
   a pre-trained generative adversarial network (GAN) model configured to generate a second vehicle damage image based on the first vehicle damage image, wherein the second vehicle damage image has a better quality than the first vehicle damage image, wherein the pre-trained GAN model comprises a pre-trained generative model and a pre-trained quality discriminative model configured to determine whether an image is a high-quality image;
   a first training unit configured to pre-train a quality discriminative model by training a classification model using a plurality of positive samples comprising high-quality vehicle damage images and a plurality of negative samples comprising low-quality vehicle damage images; and
   a second training unit configured to pre-train a generative model using at least a plurality of low-quality vehicle damage images and the pre-trained quality discriminative model.

8. The apparatus according to claim 7, wherein at least one of the following of the first vehicle damage image is of low quality: color, texture, brightness, contrast, saturation, clarity, and smoothness.

9. The apparatus according to claim 7, wherein a distortion degree of the second vehicle damage image with respect to the first vehicle damage image is less than a predetermined threshold.

10. The apparatus according to claim 7, wherein the pre-trained GAN model further comprises a pre-trained distortion degree discriminative model configured to determine a distortion degree of an output image of the generative model with respect to a corresponding low-quality vehicle damage image, and wherein, while pre-training the generative model in the GAN model, the second training unit is further configured to: train the generative model using at least the plurality of low-quality vehicle damage images and the distortion degree discriminative model.

11. The apparatus according to claim 10, wherein the distortion degree discriminative model comprises a semantic recognition model and a reconstruction model, wherein the reconstruction model is a deconvolution model of the generative model, and wherein, while pre-training the generative model, the second training unit is further configured to:
   input the output image of the generative model into the reconstruction model to obtain a reconstructed image;
   input the reconstructed image and the corresponding low-quality vehicle damage image respectively into the semantic recognition model to determine a semantic similarity between the reconstructed image and the corresponding low-quality vehicle damage image; and determine the distortion degree of the output image with respect to the corresponding low-quality vehicle damage image on the basis of the semantic similarity.

12. The apparatus according to claim 11, wherein the semantic similarity between the reconstructed image and the corresponding low-quality vehicle damage image comprises one or more of:

a similarity in vehicle part, a similarity in vehicle model, and a similarity in vehicle damage.

13. A non-transitory computer-readable storage medium storing instructions that when executed by a computer cause the computer to perform a method for enhancing a vehicle damage image, the method comprising:

obtaining a first vehicle damage image; and inputting the first vehicle damage image to a pre-trained generative adversarial network (GAN) model to obtain a second vehicle damage image, which has a better quality than the first vehicle damage image;

wherein the pre-trained GAN model comprises a pre-trained generative model and a pre-trained quality discriminative model configured to determine whether an image is a high-quality image;

wherein the pre-trained quality discriminative model is obtained by training a classification model using a plurality of positive samples comprising high-quality vehicle damage images and a plurality of negative samples comprising low-quality vehicle damage images; and wherein the pre-trained generative model is trained using at least a plurality of low-quality vehicle damage images and the pre-trained quality discriminative model.

* * * * *